United States Patent
Ringer et al.

(10) Patent No.: US 6,776,355 B2
(45) Date of Patent: Aug. 17, 2004

(54) SPRAYER SECTION CONTROL VALVE SWITCHING

(75) Inventors: John David Ringer, Colfax, IA (US); Richard Allen Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 58 days.

(21) Appl. No.: 10/205,254

(22) Filed: Jul. 25, 2002

(65) Prior Publication Data

US 2004/0016822 A1 Jan. 29, 2004

(51) Int. Cl.$^7$ .............................. B05B 1/20; B05B 1/16
(52) U.S. Cl. ...................................... 239/159; 239/170
(58) Field of Search ................................ 239/159, 170, 239/164

(56) References Cited

U.S. PATENT DOCUMENTS

| | | | | | |
|---|---|---|---|---|---|
| 4,220,998 | A | * | 9/1980 | Kays ........................... | 700/283 |
| 4,252,274 | A | * | 2/1981 | Kubacak ...................... | 239/163 |
| 4,288,034 | A | * | 9/1981 | Widmer et al. ............. | 239/168 |
| 4,637,547 | A | * | 1/1987 | Hiniker et al. .................. | 239/1 |
| 5,050,771 | A | * | 9/1991 | Hanson et al. .................. | 222/1 |
| 5,310,113 | A | * | 5/1994 | Cowgur ........................ | 239/10 |
| 5,337,959 | A | * | 8/1994 | Boyd .......................... | 239/163 |
| 5,755,382 | A | * | 5/1998 | Skotinkov .................... | 239/161 |
| 6,173,904 | B1 | * | 1/2001 | Doherty et al. ................. | 239/1 |
| 6,216,614 | B1 | * | 4/2001 | Wollenhaupt ............... | 111/118 |

OTHER PUBLICATIONS

Two pages of Deere.com Internet on John Deere 800 Series Trailed Sprayers dated Jul.11, 2002 and an enlargement of the EHC–2 Control Box information paragraph.

* cited by examiner

Primary Examiner—William C. Doerrler

(57) ABSTRACT

A sprayer switching control system includes toggle switch structure incorporated into the main control handle of the sprayer and toggling spray sections sequentially so that each section changes condition in turn as the switch structure is operated. A reset switch located adjacent the toggle switch structure is operable to reset all the sections to a preselected operating condition. A first switch toggles section condition sequentially in a first direction along the sprayer boom, while operating a second switch reverses the direction. Such toggle operation is simple and easy to learn, and can be implemented without removing the hand from the control handle. To accommodate special skip patterns and shut off unused boom sections, individual section control switches mounted away from the handle to avoid handle clutter permit selective disabling any one or more of the spray sections.

26 Claims, 5 Drawing Sheets

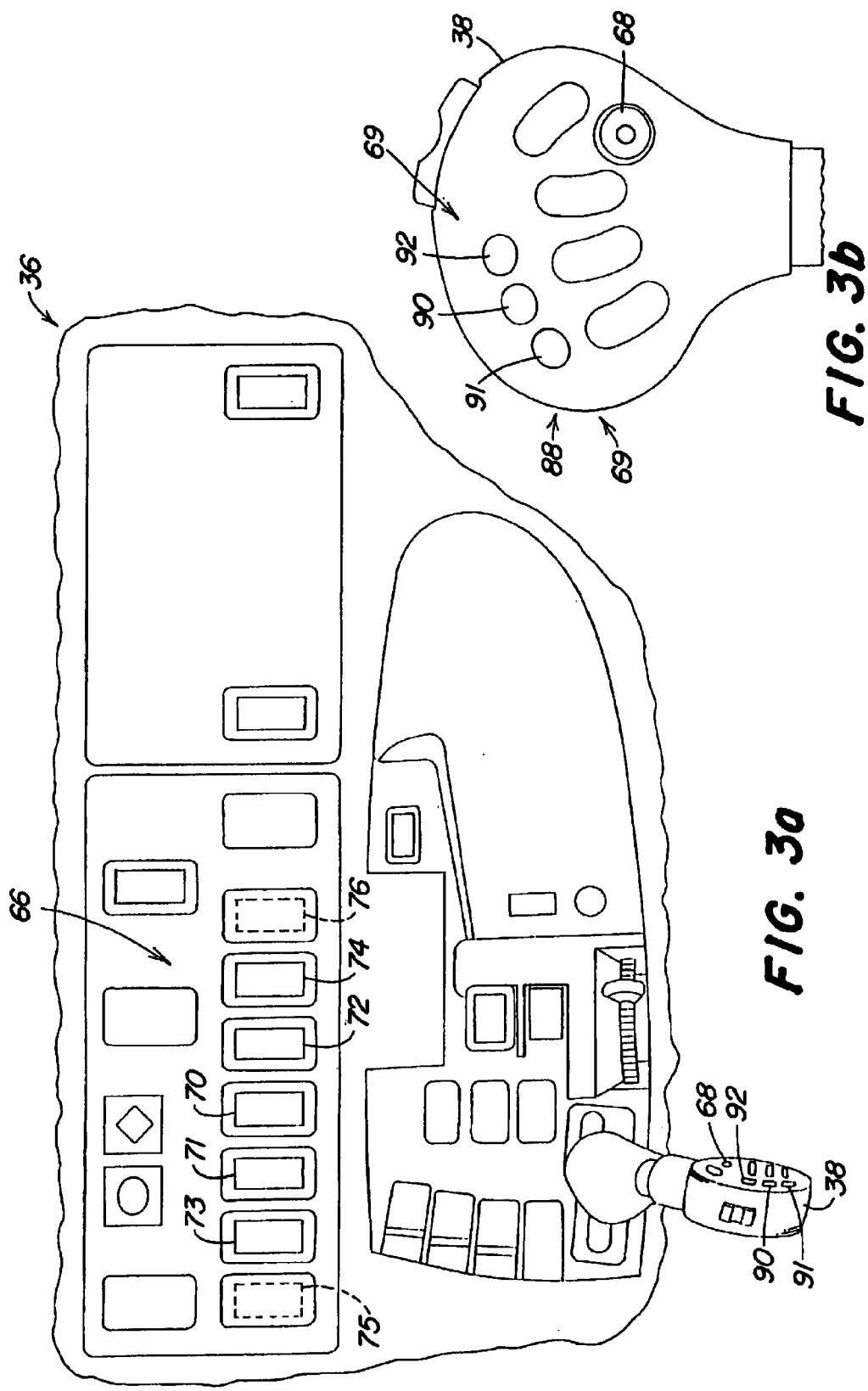

SPRAYER SECTION CONTROL VALVE SWITCHING

FIELD OF THE INVENTION

The present invention relates generally to multi-section agricultural sprayers and more specifically to section control valve switching for such sprayers.

BACKGROUND OF THE INVENTION

Most modern agricultural sprayers have a boom with multiple spray sections that can be independently controlled. A master control or switch is used to control the entire boom. In addition, each section has its own control or switch. In a typical system when the master control is on, the individual section control determines which sections are spraying. When the master control is off, all sections will not spray even though the individual section controls are on.

As sprayers get larger and the number of sections to be controlled increases, the switching arrangement tends to get more cumbersome and complex. Mastering the operation of systems with touch pad or keyboard type input controls often is difficult, particularly if non-sequential on-off spray section patterns are desired to accommodate irregular spray areas, field anomalies or skip row planting patterns.

Large sprayers can have seven or more individual spray sections to be controlled, and using a separate switch for each section requires a considerable amount of space which prevents ideally locating the switches in a convenient location. Providing a relatively simple, easy to understand and conveniently located spray control switching structure for multiple section sprayers has continued to be problematic.

SUMMARY OF THE INVENTION

It is therefore an object of the present invention to provide an improved switching system for an agricultural sprayer. It is another object to overcome the aforementioned problems.

It is a further object to provide an improved switching system for a relatively large agricultural sprayer, wherein the system includes individual spray area control for a plurality of spray sections. It is another object to provide such a system which is relatively simple to understand and operate. It is still another object to provide such a system which permits substantial spray section control from one area, such as a multifunction control handle, using relatively few switches. It is another object to provide such a system which can be conveniently and intuitively operated from a vehicle control lever or the like utilizing only a small number of switches compared to the number of sections that are controlled.

It is yet another object of the invention to provide an improved spray control switching system wherein different areas of the sprayer can be easily switched from one condition to another to accommodate irregular field borders or various types of field anomalies. It is another object to provide such a system wherein selected sections or areas of the spray structure can be easily locked out of operation or returned to operation from the locked out condition. It is yet another object to provide such a system wherein primary control of spray switching is located in one convenient location, such as the multifunction control handle.

A sprayer switching control system includes a controller connected to the sections of a sprayer to control spray rate and turn spray areas or sprayer nozzle sections on and off. The sprayer includes a multifunction control handle providing various control functions such as master spray on-off, spray boom position and ground drive speed. To control sprayer sections from the same area, toggle switch structure is incorporated into the handle and connected to the controller. The switch structure toggles the spray sections sequentially so that each section changes condition in turn as the switch structure is operated. A reset switch located adjacent the toggle switch structure is operable to reset all the sections to a preselected operating condition. Preferably, the toggle switch structure includes first and second switches located on opposite sides of the reset switch. Operating the first switch toggles the sections sequentially from a first side of the sprayer towards a second side, while operating the second switch sequences the operation in the opposite direction. For example, if the sprayer is operating near a converging field boundary, the switch corresponding to that side can be operated to turn off the outer section on that side to accommodate the narrowing spray area. If further narrowing is necessary, the switch is operated again to turn off the next section, and so on. If the spray areas widen again, the second switch is depressed to turn each section on in turn. If the spray pattern is to be narrowed from the opposite side, the second switch is operated to turn off the sections on that side. The first switch then can be operated to turn the sections on in turn as the spray area widens on that side. Such toggle operation is simple and easy to learn and can be accomplished without removing the hand from the control handle.

To accommodate situations where individual spray sections are to be locked out such as when the outer sections of the sprayer boom are folded in, individual boom control switches mounted on the console adjacent the control handle are connected to the controller so any one or more of the sections can be disabled. Maintaining the individual section switches also permits adjustment of the spray pattern for field anomalies or row patterns that require alternate sections or central portions of the sprayer to be switched off.

These and other objects, features and advantages of the present invention will become apparent from the description which follows and from the drawings.

BRIEF DESCRIPTION OF THE DRAWINGS

FIG. 3a is a perspective view of the console, multifunction control handle and boom control switch structure for the circuit of FIG. 2.

FIG. 3b is an enlarged front view of the control handle.

DESCRIPTION OF THE PREFERRED EMBODIMENTS

Figure 1:
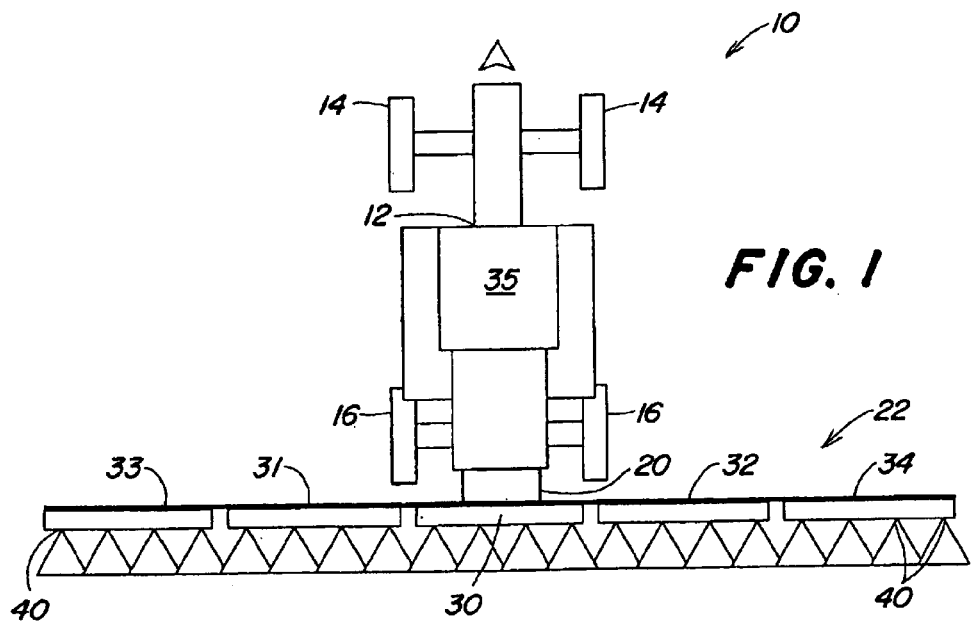
FIG. 1 is a schematic representation of an agricultural field sprayer having multiple nozzle sections.

Referring to FIG. 1, therein is depicted an agricultural sprayer 10 including a main frame 12 supported for forward movement over a field by front and rear ground wheels 14 and 16 powered by a conventional hydraulic drive arrangement (not shown). A vertically adjustable boom support frame 20 is connected to the rear of the frame 12 and supports a multi-section folding boom assembly 22 shown in the fully extended field working position for spraying a wide area. The assembly 22 is shown with five sections, including a center (C) section 30, a left center (LC) section 31 and a right center (RC) section 32 connected to the center section 30, and a left (L) outer section 33 and a right (R) outer section 34 connected to the sections 31 and 32, respectively. The sprayer 10 may be generally of the type exemplified by the commercially available John Deere model 4710 Sprayer and includes an operator station 35 having a control console 36 (FIGS. 3a and 3b) and a main control handle 38 for controlling various sprayer and boom functions including sprayer drive functions.

Figure 2:
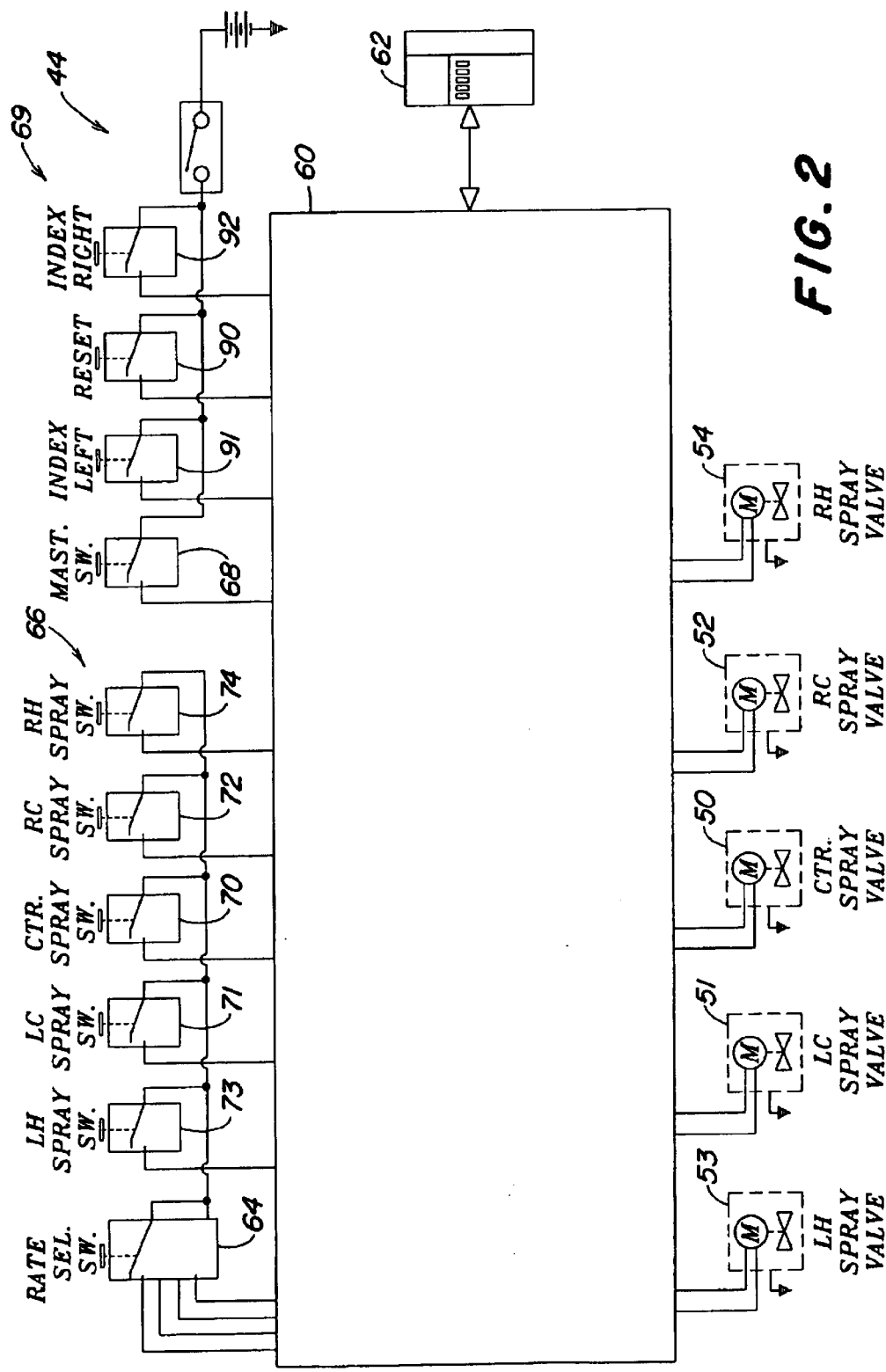
FIG. 2 is a schematic of the section valve control circuit for the sprayer of FIG. 1.

Each of the sections 30–34 include spray nozzles 40 providing a desired spray pattern across the width of the sprayer. The sections are controlled by a spray control circuit 44 illustrated in FIG. 2 and including electrically controlled valves 50, 51, 52, 53, and 54 operably connected to the sections 30, 31, 32, 33 and 34, respectively. The valves 50–54 are connected to a main spray controller 60 which, in turn, is connected to a data entry and display device 62, a rate selector switch 64, and a bank of individual section control switches 66, a master boom control switch structure 68 and a toggle switch structure 69. Although the spray control circuit 44 will be described using a conventional microprocessor-based device, it is to be understood that other types of controllers, such as conventional relay-based controllers or simple logic controllers, could also be utilized with the switching structure. In addition, section control can include individual nozzle or boom area control and control of devices other than valves to effect different types of spray patterns.

The bank of control switches 66 includes manual switches 70, 71, 72, 73 and 74 establishing a preselected condition for any one or more of the associated sections 30, 31, 32, 33 and 34, respectively. Preferably, the preselected operating condition is a disable mode so that when one of the switches 70–74 is moved to disable position, the corresponding one of the spray valves 50–54 will remain off regardless of any other control inputs to the controller 60. The switches 70–74 can, for example, be used to shut off the outer sections 33 and 34 when these sections are folded inwardly out of use. In addition, if a particular spray pattern is required that is not available utilizing the simplified toggle switching arrangement on the control handle, such as center section 30 off and the remaining sections on, the pattern can be easily provided with the control switches 66. Additional switches such as indicated at 75 and 76 may also be provided to control additional spray nozzles or additional sections on machines with more than five sections. Only the sections which are not disabled by the control switches 66 of FIG. 3a (non-disabled sections) will be affected by operation of switch structure located on the control handle 38. Preferably the bank of control switches 66 is located on the console 36 at the operator station 35 adjacent but offset from the control handle 38 so the handle layout is simplified while still retaining full control of spray section patterns.

The control handle 38 (FIGS. 3a and 3b) includes toggle or boom indexing switch structure 88 having reset, index left and index right momentary on switches 90, 91 and 92, respectively, connected to the controller 60. The switches 91 and 92 are utilized to sequentially select spray sections which are not disabled by the switches 66 and to toggle the condition of the selected section. The switch 91 sequences the sections from right to left along the boom, while the switch 92 sequences the sections in the opposite direction or from left to right along the boom.

Figure 4:
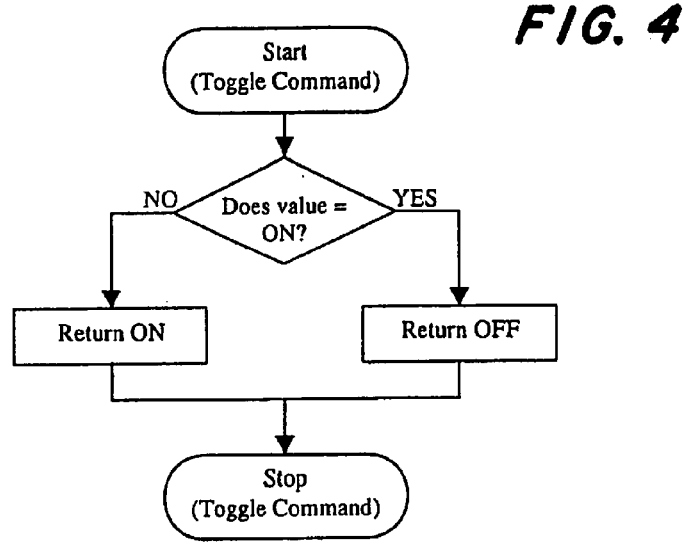
FIG. 4 is a flow chart showing the subroutine for the toggle feature of the control for the processor of the control circuit of FIG. 2.

The controller 60 polls the state of the switches 90–92, and if, for example, the index left switch 91 is depressed with all the non-disabled sections in the on condition, the right-most non-disabled section is toggled to the off condition and the next section to the left is selected. Pressing the switch 91 again turns off that next section. A non-disabled section is turned off and the next section is selected each time the switch 91 is depressed until the last non-disabled section is turned to the off condition. At that time, the right-most non-disabled section is again selected, and if the switch 91 is depressed without a reset via switch 90, the right-most non-disabled section is returned to on condition, and the sequence continues. The index right switch 92 works in a similar fashion with the exception that sequencing is in the direction from the left side of the boom towards the right side. A flow chart for the toggling of the selected section is shown in FIG. 4.

Depressing the index right switch 92 after the index left switch 91 has turned a section off will cause the controller 60 to return the last toggled section back to the on condition. Depressing the index left switch 91 after the index right switch 92 has turned a section off will return that section to the on condition. Therefore, the outermost operating section on either side can be conveniently toggled on and off by alternately hitting the index left and index right switches 91 and 92. At any time, the reset switch 90 may be depressed to return all the non-disabled sections to the on condition. Once the non-disabled sections are returned to the on condition, repeatedly depressing the left index switch 91 will cause the controller 60 to turn off the non-disabled sections in turn from the right side of the boom towards the left side. After reset utilizing the switch 90, depressing the index right switch 92 repeatedly will cause the controller to turn off the non-disabled sections sequentially from the left side of the boom towards the right.

Figure 5:
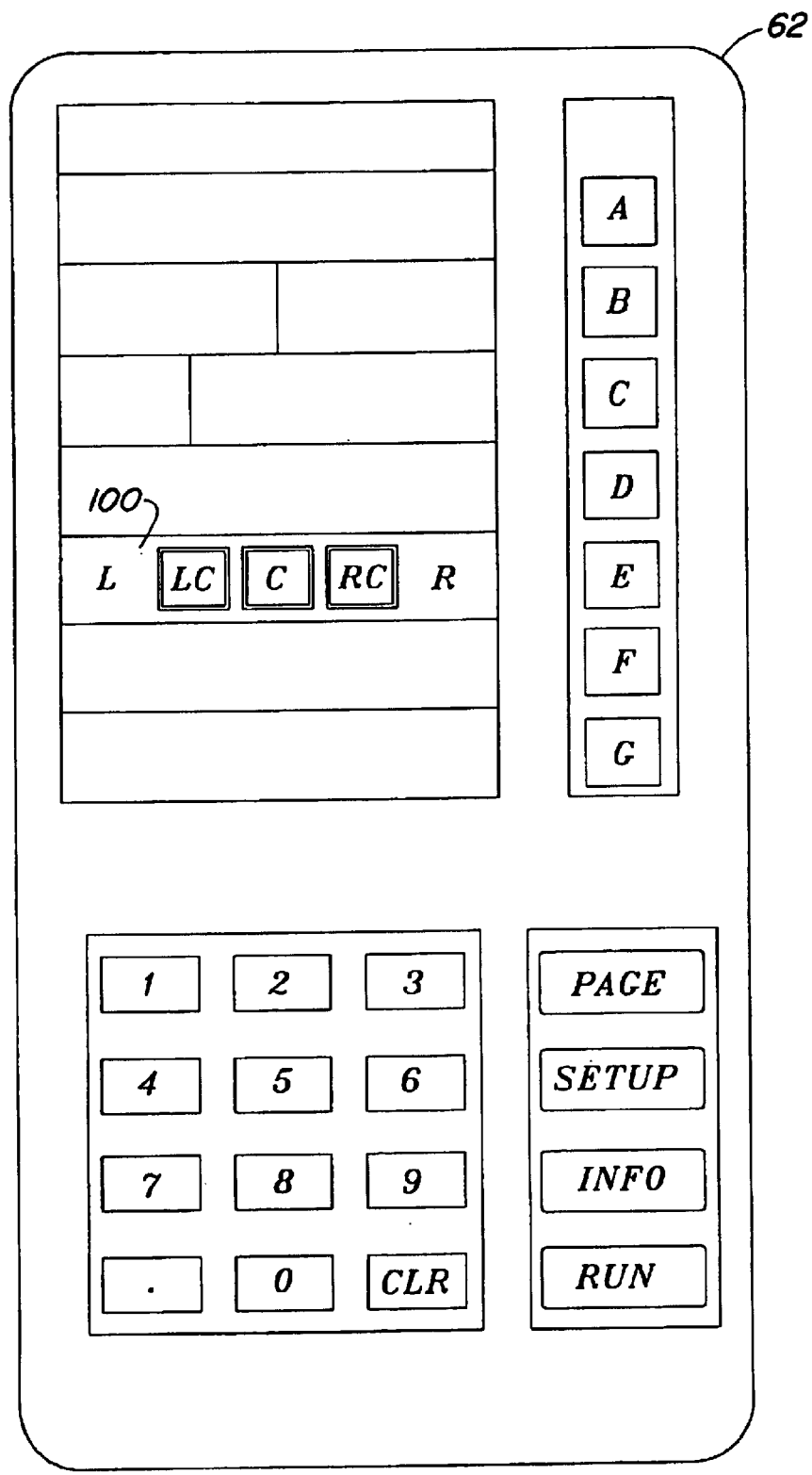
FIG. 5 is a view of the data entry and display device for the sprayer.

If the controller 60 detects that the master boom control switch 68 has been depressed during operation, the controller turns off all the nozzle sections on the sprayer. Depressing the master switch 68 again causes the controller 60 to return the sprayer sections to their last operating conditions, unless a new spray pattern is selected by the switches 90–92 and/or the control switches 66 after the nozzle sections are turned off by the master switch 68. The data entry and display device 62 includes a spray section condition panel 100 (FIG. 5) with sprayer section indices L, LC, C, RC, and R for a five-section machine. Additional indices may be added to the panel 100 for machines with more sections. If a section is in the on condition, that section is visually highlighted so the operator can quickly and easily determine the spray pattern selected. The spray pattern may be easily changed utilizing the switches 90–92 and/or the switches 66, while the master switch 68 is on or off, and the display panel 100 will highlight the nozzle sections (see, for example, C, LC and RC of FIG. 5) which are spraying or will be spraying when the master switch 68 returns the boom to the operating condition.

Figure 6:
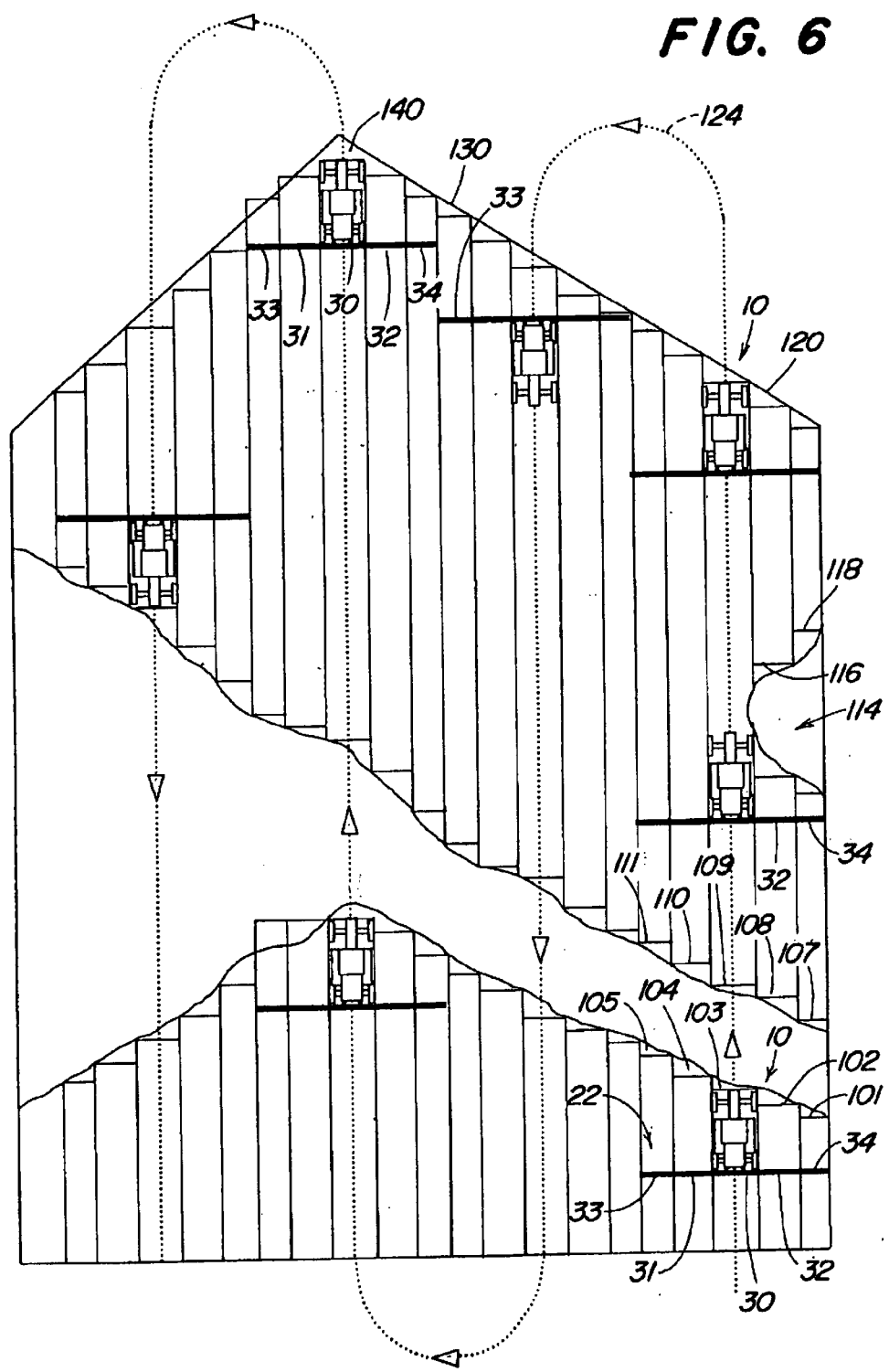
FIG. 6 is a schematic representation of the operation of the sprayer of FIG. 1 illustrating the operation of the section valve control circuit over different areas of a field.

In operation (FIG. 6) assuming the operator has all the spray sections 30–34 on, the sprayer 10 is driven forwardly with a full spray pattern until the right-most section 34 encounters an area 101 of a waterway or the like which is not to be sprayed. The operator depresses the index left switch 91, and the controller 60 turns off the spray valve 54 so the section 34 stops spraying. As the spray boom approaches each of the non-spray areas 102, 103, 104 and 105, the index left switch 91 is depressed to cause the sections 32, 30, 31 and 33 to stop spraying in that order until the entire boom is in a non-spraying condition for passing over the waterway. As the section 34 approaches an area 107 where spraying is to resume, the operator depresses the index left switch 91 again, which returns the section 34 to a spraying condition. The switch 91 is repeatedly pressed for the areas 108, 109, 110 and 111 until the entire boom is again spraying. Depressing the index left switch 91 twice at the boundary to a non-spray area 114 sequentially turns off the sections 34 and 32 in turn to better follow the non-spray boundary. Upon reaching the area 116 where spraying is to resume, the operator simply depresses the index right switch 92 to toggle the section 32 on. Depressing the index right switch 92 again at the area 118 returns the section 34 to the spraying condition. As the sprayer 10 approaches an angled headland 120, the index left switch 91 is depressed repeatedly to prevent spraying in the headland while providing optimum spray coverage at the end of the spray area.

While turning on the end, the operator can hit the master switch 68 to turn off the entire boom. During the turn, the off conditions can be selected for all the sections except the right-most section 34 which will first encounter a spray area. Since the boom sections were all toggled off already prior to the turn, the index left switch 91 may simply be depressed once to toggle the right-most section on. When spray area 130 is first encountered, the operator can then switch on the boom by briefly depressing the master switch 68 so the section 34 begins spraying. The index left switch 91 is depressed each time an adjacent section reaches a corresponding spray area.

In a spray area where a skip pattern is required or where only one or more of the centrally located spray sections are to be turned off or left on, such as at area 140, the operator can establish the desired pattern utilizing the section control switches 66 in combination with the toggle switch structure 69. Approaching the area 140, the operator depresses the index left switch 91 twice to turn off the spray from sections 34 and 32 in turn and operates the individual switches 73 and 71 to turn off the sections 33 and 31, respectively, one after the other as the sections begin to encounter the non-spray areas in the headland.

Having described the preferred embodiment, it will become apparent that various modifications can be made without departing from the scope of the invention as defined in the accompanying claims.

What is claimed is:

1. A spray control system for a sprayer with a plurality of individually controlled spray sections having first and second selectable spray conditions, the system comprising:
   an electronic controller connected to the sections and controlling the spray conditions of the sections;
   toggle switch structure connected to the controller and operable to cause the controller to change the selected conditions of the spray sections;
   wherein the toggle switch structure includes a single first switch which reverses the selected condition of a plurality of successive spray sections in turn as the first switch is operated; and
   a main control switch connected to the controller and providing a control signal to the controller for selecting the second condition for the spray sections independently of the condition selected by the toggle switch structure.

2. The system as set forth in claim 1 further comprising section control switches connected to the controller, each section control switch associated with a different one of the spray sections and operable to override the toggle switch structure selection for that section to maintain a preselected condition for that spray section.

3. The system as set forth in claim 1 including a sprayer control handle for controlling the sprayer over a field, and wherein the toggle switch structure is located on the control handle.

4. The system as set forth in claim 3 wherein the first switch selects the spray sections in sequence in a first direction and the toggle switch structure further includes a second switch for selecting the spray sections in sequence in a second direction.

5. The system as set forth in claim 4 wherein the main control switch is located adjacent the first and second switches on the control handle.

6. A spray control system for a sprayer having a plurality of individually controlled spray sections having first and second selectable spray conditions, the system comprising:
   an electronic controller connected to the sections and controlling the sections;
   toggle switch structure connected to the controller, the toggle switch structure operable to cause the controller to change the selected conditions of the spray sections;
   wherein the toggle switch structure includes a single first switch which reverses the selected condition of a plurality of the spray sections sequentially as the single first switch is operated; and
   section control switches connected to the controller, each section control switch associated with a different one of the spray sections and operable to override the toggle switch structure selection for that spray section to maintain a preselected condition for that spray section.

7. The system as set forth in claim 6 further comprising:
   a boom control switch connected to the controller and providing a control signal to the controller for selecting the second condition for the spray sections independently of the condition selected by the toggle switch structure.

8. The system as set forth in claim 6 including a sprayer control handle for controlling the sprayer over a field, and wherein the first switch is located on the control handle.

9. The system as set forth in claim 8 wherein the first switch reverses the selected conditions of each of the plurality of spray sections in sequence in a first direction and the toggle switch structure includes a second switch for reversing the selected condition of each of the spray sections in sequence in a second direction.

10. A. Spray control system for a sprayer having a plurality of individually controlled spray sections having first and second selectable spray conditions, the system comprising:
    an electronic controller connected to the sections and controlling the sections;
    toggle switch structure connected to the controller, the toggle switch structure operable to cause the controller to change the selected conditions of the spray sections;
    wherein the toggle switch structure reverses the selected condition sequentially as the toggle switch is operated;
    section control switches connected to the controller, each section control switch associated with a different one of the spray sections and operable to override the toggle switch structure selection for that section to maintain a preselected condition for that spray section;
    a sprayer control handle for controlling the sprayer over a field, wherein the toggle switch structure is located on the control handle and the toggle switch structure includes a first switch for selecting the spray sections in sequence in a first direction and a second switch for selecting the spray sections in sequence in a second direction; and
    wherein the boom control switch is located adjacent the first and second switches on the control handle, and further including a reset switch located on the handle for resetting the spray sections to a selected condition.

11. An agricultural sprayer spray control system for controlling multiple spray sections having at least first and second spray conditions, the sprayer having a control lever for operating the sprayer over a field to be sprayed, the spray control system comprising:
    a controller connected to the multiple spray sections;
    spray control switch structure connected to the controller and controlling the spray conditions of the spray sections; and wherein the spray control switch structure includes a reset switch located on the control lever and a toggle switch structure located adjacent the reset switch; and wherein the reset switch is operable to turn the multiple spray sections to a preselected condition and the toggle switch structure is operable to control individual sections.

12. The spray control system as set forth in claim 11 including section select switch structure connected to the controller and operable to select one or more of the spray sections to remain in the second condition regardless of toggle switch structure operation, facilitating a skip pattern of spray section operation.

13. The spray control system as set forth in claim 11 wherein the toggle switch structure includes a first switch for toggling the selected spray section conditions in sequence in one direction and a second switch for toggling the selected spray section conditions in sequence in a second direction opposite the first direction.

14. The spray control system as set forth in claim 13 wherein the first and second switches are located on opposite sides of the reset switch.

15. The spray control system as set forth in claim 14 including a reset switch located adjacent the first and second switches and operable to return the multiple spray sections to a preselected condition.

16. The spray control system as set forth in claim 11 further comprising sprayer section control switches connected to the controller and operable to maintain one or more of the sections in a preselected condition regardless of the operation of the toggle switch.

17. An agricultural sprayer spray control system for controlling multiple spray sections having at least first and second spray conditions, the sprayer having a control lever for operating the sprayer over a field to be sprayed, the spray control system comprising:

a controller connected to the multiple spray sections;

spray control switch structure located on the lever and connected to the controller, the spray control switch structure controlling the spray conditions of the spray sections; and wherein the spray control switch structure includes a single first switch located on the control lever and operable for sequentially changing the spray condition of each of a plurality of sections in turn as the first switch is operated.

18. The system as set forth in claim 17 further comprising a plurality of section switches offset from the handle and operable to maintain one or more of the spray sections in a given condition regardless of the operation of the first toggle switch.

19. The system as set forth in claim 17 wherein the first switch changes the spray condition of the sections sequentially in a first direction.

20. The system as set forth in claim 19 including a second switch located on the control lever for changing the spray condition of sections sequentially in a second direction different than the first direction.

21. An index switching system for a sprayer having a sprayer boom and a plurality of spaced spray nozzle sections extending between first and second ends of the boom, each section having an on condition and an off condition, the system selectively controlling the operating conditions of the sections and comprising:

a control handle;

a plurality of individual control switches connected to the nozzle sections and operable to selectively disable one or more of the nozzle sections to prevent spraying from the disabled sections;

switch structure located on a control handle for sequentially toggling the nozzle sections which are not disabled between the operating and off conditions; and a boom control switch located on the control handle for selecting operating and non-operating conditions, wherein when the non-operating condition is selected, the sections are returned to the off conditions; and further comprising a reset switch located on the control handle adjacent the control switch and switch structure for resetting the sections to a first set of conditions.

22. The system as set forth in claim 21 wherein the switch structure comprises a first switch for sequencing the nozzle sections in a direction from the first end towards the second end, and a second switch for sequencing the nozzle sections in a direction from the second end towards the first end.

23. A switching system for a sprayer having a sprayer boom and a plurality of spaced spray nozzle sections extending between first and second ends of the boom for spraying a field, each section having an on condition and an off condition, the system selectively controlling the operating conditions of the sections and comprising:

a spray control handle;

means located on the spray control handle for sequentially selecting two or more sections in a first direction corresponding to the direction from the first end towards the second end and changing the operating condition of the selected sections in turn while spraying in the field;

means for reversing the order of sequentially selecting sections so the sections are selected and the operating conditions are changed in a second direction opposite the first direction; and wherein the means for sequentially selecting two or more sections in a first direction includes a single operable first switch, the operating condition of the sections changing in turn in the first direction with each operation of the switch.

24. The system as set forth in claim 23 wherein the means for reversing the order comprises a second switch located on the control handle adjacent the first switch.

25. The system as set forth in claim 23 further comprising a switch associated with each nozzle section for selectively disabling that nozzle section and preventing the nozzle section from being turned on as the sections are sequentially selected, facilitating a skip pattern of nozzle section conditions.

26. The system as set forth in claim 23 including a master boom control switch having a first condition for selectively disabling all the nozzle sections and a second condition for enabling the nozzle sections which are in the on condition.

* * * * *